United States Patent [19]

Chu et al.

[11] Patent Number: 5,317,061

[45] Date of Patent: May 31, 1994

[54] FLUOROPOLYMER COMPOSITIONS

[75] Inventors: Edward F. Chu, Sunnyvale; Vijay Reddy, San Mateo; Robert P. Saltman, Redwood City, all of Calif.

[73] Assignee: Raychem Corporation, Menlo Park, Calif.

[21] Appl. No.: 21,827

[22] Filed: Feb. 24, 1993

[51] Int. Cl.$^5$ .............. C08L 27/18; C08L 27/20; C08L 27/12

[52] U.S. Cl. ..................... 525/200; 525/199

[58] Field of Search ................. 525/199, 200

[56] References Cited

U.S. PATENT DOCUMENTS

| | | | |
|---|---|---|---|
| 3,484,503 | 12/1969 | Magner et al. | 525/200 |
| 3,861,029 | 1/1975 | Smith-Johannsen et al. | 29/611 |
| 3,914,363 | 10/1975 | Bedard et al. | 264/105 |
| 4,177,376 | 12/1979 | Horsma et al. | 219/553 |
| 4,188,276 | 2/1980 | Lyons et al. | 204/159.17 |
| 4,237,441 | 12/1980 | van Konynenburg et al. | 338/22 R |
| 4,238,812 | 12/1980 | Middleman et al. | 361/106 |
| 4,242,573 | 12/1980 | Batliwalla | 219/528 |
| 4,286,376 | 9/1981 | Smith-Johannsen et al. | 29/611 |
| 4,318,881 | 3/1982 | Sopory | 264/346 |
| 4,334,148 | 6/1982 | Kampe | 219/553 |
| 4,334,351 | 6/1952 | Sopory | 29/611 |
| 4,347,487 | 8/1982 | Martin | 333/1 |
| 4,352,083 | 9/1982 | Middleman et al. | 338/23 |
| 4,388,607 | 6/1983 | Toy et al. | 338/22 SD |
| 4,413,301 | 11/1983 | Middleman et al. | 361/106 |
| 4,426,339 | 1/1984 | Kamath et al. | 264/22 |
| 4,459,473 | 7/1984 | Kamath | 219/553 |
| 4,591,700 | 5/1986 | Sopory | 219/505 |
| 4,624,990 | 11/1986 | Lunk et al. | 525/199 |
| 4,749,752 | 6/1988 | Youlu et al. | 525/199 |
| 4,792,117 | 12/1988 | Kubota | 525/199 |
| 4,859,836 | 8/1989 | Lunk et al. | 219/548 |
| 5,000,875 | 3/1991 | Kolouch | 252/511 |
| 5,041,500 | 8/1991 | Ishiwari et al. | 525/200 |
| 5,057,345 | 10/1991 | Barrett | 428/35.1 |
| 5,179,167 | 1/1993 | Ishiwari et al. | 525/200 |

FOREIGN PATENT DOCUMENTS

| | | | |
|---|---|---|---|
| 362868 | 4/1990 | European Pat. Off. | C08L 27/18 |
| 2840356 | 4/1980 | Fed. Rep. of Germany | 525/199 |

OTHER PUBLICATIONS

"Predicting the Properties of Mixtures: Mixture Rules in Science and Engineering", Lawrence E. Nielsen, pp. 5–9 (Marcel Dekker, Inc., 1978).

Primary Examiner—Carman J. Seccuro, Jr.
Attorney, Agent, or Firm—Herbert G. Burkard; Marguerite E. Gerstner; Timothy H. P. Richardson

[57] ABSTRACT

A composition which contains 35 to 85% by weight of a copolymer of tetrafluoroethylene and hexafluoropropylene (FEP), 10 to 60% by weight of a copolymer of tetrafluoroethylene and perfluoropropylvinyl ether (PFA), and 5 to 60% by weight of melt-processable polytetrafluoroethylene (PTFE). The composition is particularly suitable for use as an insulating material on a substrate such as a resistive element in a conductive polymer heating cable. The composition has good physical properties, low creep, and low secondary crystallization, and exhibits little stress-cracking when exposed to elevated temperatures.

13 Claims, 4 Drawing Sheets

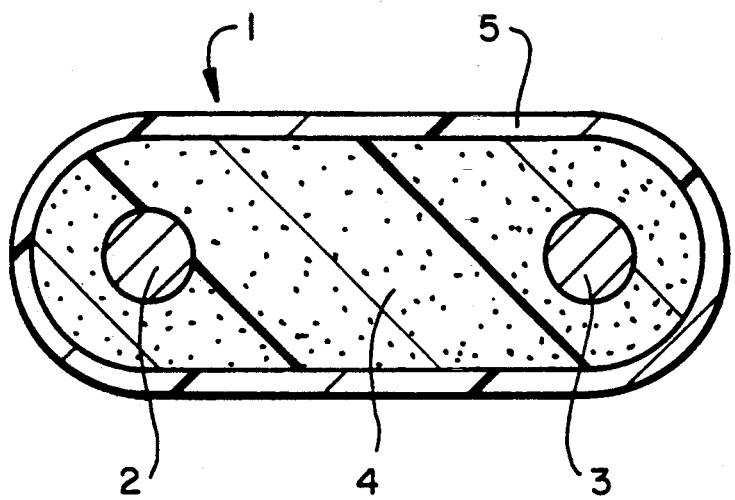
FIG_1

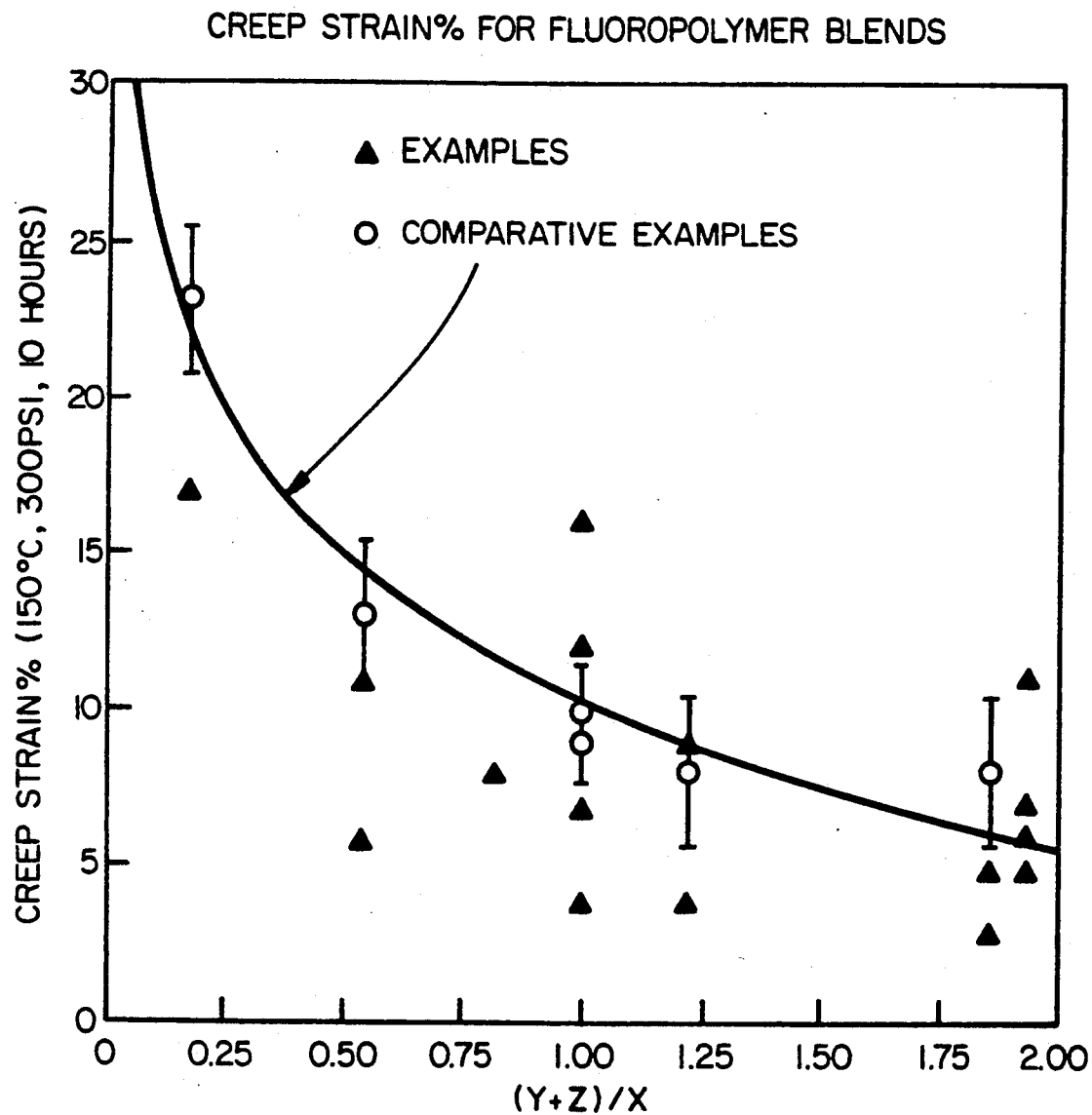
FIG_2

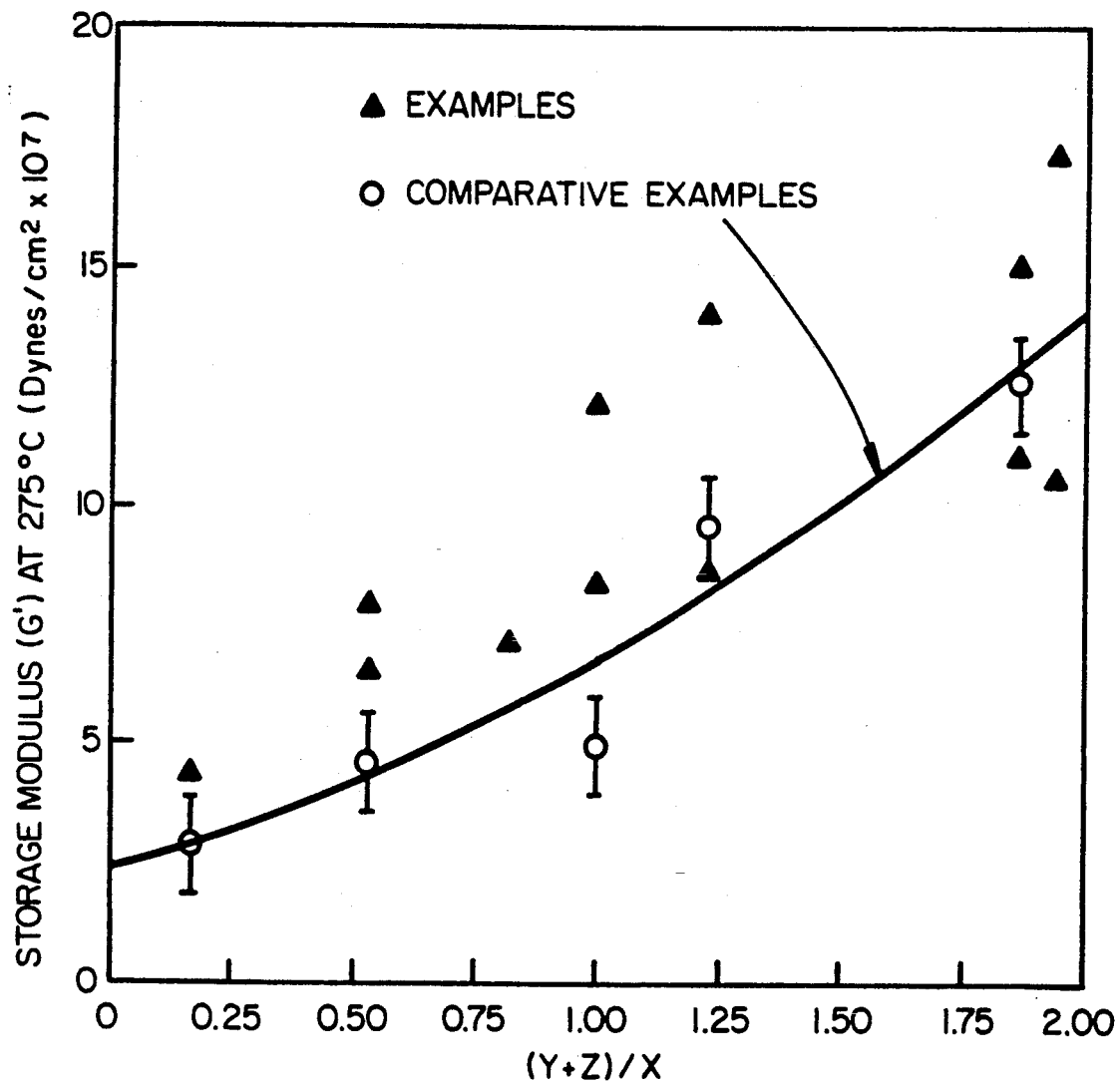
FIG_3

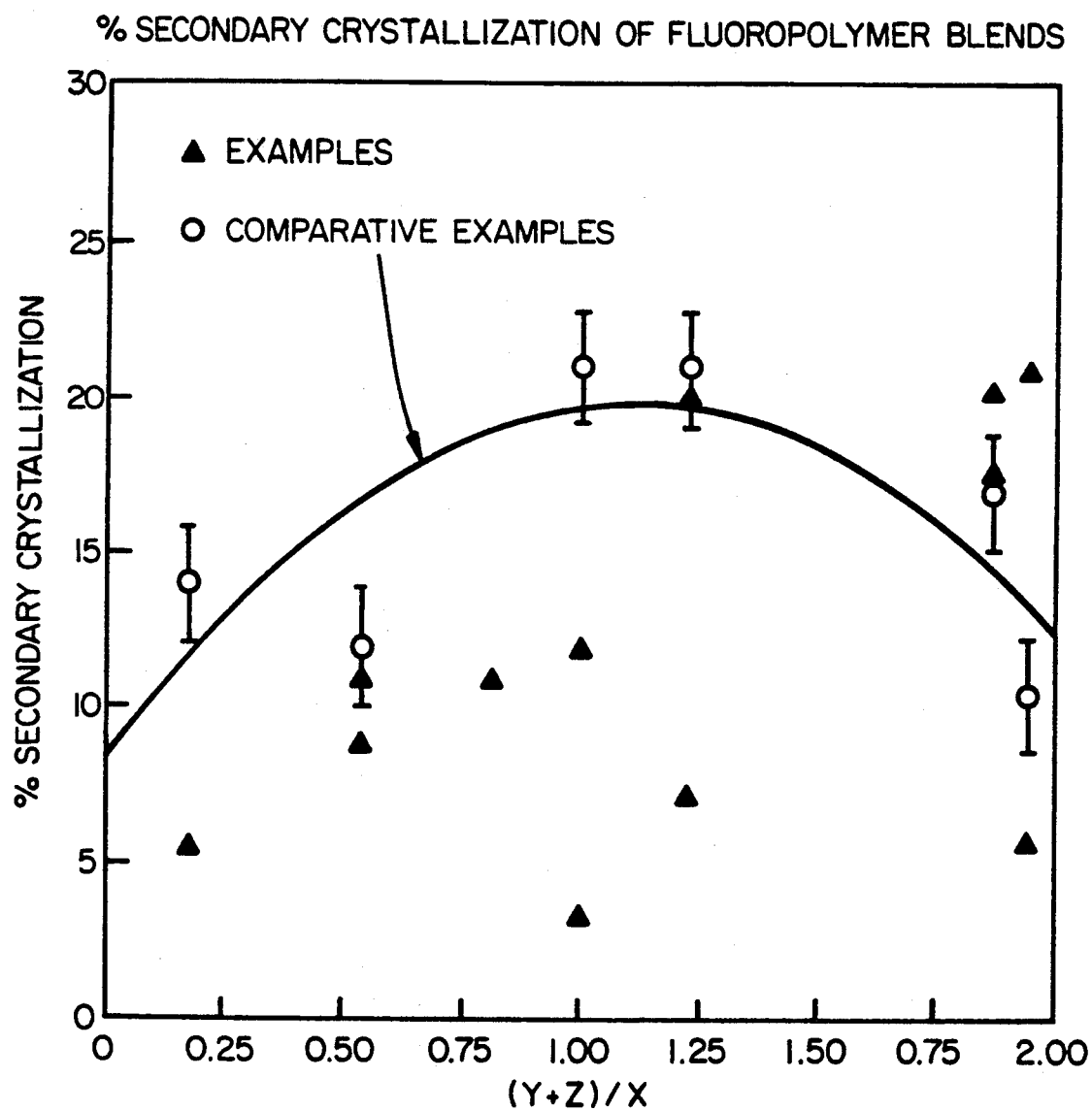
FIG_4

FLUOROPOLYMER COMPOSITIONS

BACKGROUND OF THE INVENTION

1. Field of the Invention

This invention relates to polymeric compositions comprising fluoropolymers.

2. Introduction to the Invention

Fluoropolymers are well known and are widely used in a variety of applications due to their generally good physical and electrical properties and ability to withstand relatively high temperatures. Depending on their chemical composition, fluoropolymers can be thermoplastic, elastomeric, or thermoplastic elastomers. Commercially available fluoropolymers include polytetrafluoroethylene (PTFE), tetrafluoroethylene/hexafluoropropylene copolymer (FEP), perfluoroalkoxy resin (PFA), polychlorotrifluoroethylene (PCTFE), ethylene/tetrafluoroethylene copolymer (ETFE), polyvinylidene fluoride ($PVF_2$), and polyvinylfluoride (PVF). Typically these materials exhibit high melting temperatures, low glass transition temperatures, good solvent resistance, good insulation properties, low coefficient of friction, low flammability, low gas permeability, and good physical stability. Many of these fluoropolymers, however, are subject to stress-cracking, particularly if they are thermoplastic and if the conditions of use require exposure to elevated temperature. Those fluoropolymers such as PFA which have good stress-crack resistance tend to be expensive but usually have more than adequate physical properties, e.g. flexibility and creep resistance, to meet product requirements.

For some applications, it is desirable to blend two or more fluoropolymers in order to achieve advantages in terms of processability, temperature stability, or cost over the properties of the individual polymer components. For example, U.S. Pat. Nos. 4,624,990 and 4,859,836 (Lunk et al, issued Nov. 25, 1986 and Aug. 22, 1989, respectively) describe a melt-shapeable composition in which a first fluoropolymer of relatively low crystallinity, e.g. a copolymer of tetrafluoroethylene and a perfluorinated comonomer, and a second fluoropolymer of relatively high crystallinity which is not melt-shapeable in the absence of other polymers, e.g. irradiated polytetrafluoroethylene, are mixed to produce a highly crystalline material that can be melt-shaped, has a high melting point, and good tensile and elongation properties.

U.S. Pat. No. 5,057,345 (Barrett, issued Oct. 15, 1991) discloses a composition in which a fluorinated ethylene-propylene copolymer is mixed with a block copolymeric fluoroelastomer to produce a material with high tensile strength, low modulus, increased flexibility, and improved stress-crack resistance.

U.S. Pat. No. 5,041,500 (Ishiwari et al, issued Aug. 20, 1991) discloses a heterogeneous melt-processable blend of FEP and PFA suitable for making articles in which dimensional control is maintained. The disclosure of each of the patents referred to above is incorporated herein by reference.

SUMMARY OF THE INVENTION

Among the applications for which fluoropolymers are commonly used is as electrical insulation on a substrate, e.g. as a jacket around a conductor or as a melt-extruded layer around a resistive element in a conductive polymer heating cable. Because the fluoropolymer jacket provides both electrical and environmental protection, it is important that there be no cracks or fractures in the insulation layer. Furthermore, it is necessary that the composition be relatively stable, i.e. that it exhibit a minimal amount of creep over the life of the product. Thus, materials which are subject to stress-cracking or to creep are not desirable. The problem is exacerbated if the substrate commonly operates at or is subjected to high temperature, i.e. temperatures greater than about 150° C.

FEP is a melt-processable insulating material which is known to stress-crack. It is known that FEP has a relatively low initial crystallinity resulting from the rapid cooling (quenching) which occurs when the polymer exits the die and is cooled at the end of an extrusion process. In order to improve the physical performance of the FEP, it is common to anneal the extruded FEP at high temperature for a lengthy period, a process which maximizes the total crystallinity level of the polymer. It is further proposed that the combination of the quenching and annealing processes results in a high level of internal stress. Such stress is especially likely to occur when the polymer is constrained as a result of the design of the extruded article. The inability to relieve the build-up in stress can ultimately lead to cracking. It is also known that FEP is susceptible to creep, especially at or near its glass transition temperature, $T_g$. Stress-cracking can result from creep, and thus creep is a possible mechanism for jacket failure. Although FEP is useful for low temperature applications, more expensive materials, e.g. PFA, which have low creep, higher initial crystallinity, better secondary crystallization, and better high temperature properties must often be selected because the combination of these properties yields improved resistance to stress cracking.

We have now discovered that a mixture of PFA, FEP, and a third component, polytetrafluoroethylene (PTFE), provides compositions having low creep, high initial crystallinity, low secondary crystallization, and good high temperature properties. The advantages achieved by the mixture of the three components are greater than those expected based on conventional mixing rules in which a property of the mixture is strictly based on a linear combination of the properties of the components in the mixture. See, for example, pages 5 to 9 in "Predicting the Properties of Mixtures: Mixture Rules in Science and Engineering" by Lawrence E. Nielsen (Marcel Dekker, Inc., 1978), the disclosure of which is incorporated herein by reference. Under conventional mixing rules, if the components of the mixture are miscible, the property of the mixture equals the sum of the property of each individual component times the concentration (e.g. in weight percent) of each individual component. For the compositions of the invention, it appears that there is positive synergy which occurs by mixing the three components, resulting in compositions with surprisingly good properties, particularly when compared to compositions containing only two components. The resulting compositions can be used to provide jacketing materials which exhibit little stress-cracking.

In a first aspect, this invention provides a polymer composition comprising a polymer component which comprises (A) an amount x which is 35 to 85% by weight of the total polymer component of a copolymer of tetrafluoroethylene and hexafluoropropylene (FEP), (B) an amount y which is 10 to 60% by weight of the total polymer component of a copolymer of tetrafluoroethylene and perfluoropropylvinyl ether (PFA), and (C) an amount z which is 5 to 60% by weight of the total polymer component which is (i) a fluoropolymer which is polytetrafluoroethylene and (ii) melt-processable, wherein the quantity (y+z)/x is 0.3 to 2.

In a second aspect, this invention provides an electrical device which comprises (1) a resistive heating element which comprises a melt-shaped conductive polymer element and at least two electrodes which can be connected to a source of electrical power and which, when so connected, cause current to flow through the conductive polymer element; and (2) an electrically insulating jacket which surrounds the heating element, which is composed of a composition according to the first aspect of the invention, and which (a) has creep strain at 150° C. and 300 psi for 10 hours of less than 15%,
  (b) has a modulus at 275° C. of at least $5 \times 10^7$ dynes/cm$^2$,
  (c) has secondary crystallization of less than 20%, and
  (d) has a tensile strength at 23° C. of at least 3000 psi.

BRIEF DESCRIPTION OF THE DRAWING

FIG. 1 is a cross-section of an electrical device of the invention;

FIG. 2 is a graph showing the effect on the percent creep of different compositions of the invention;

FIG. 3 is a graph showing the effect on the modulus at 275° C. of different compositions of the invention; and FIG. 4 is a graph showing the effect on the secondary crystallization of different compositions of the invention.

DETAILED DESCRIPTION OF THE INVENTION

The term "fluoropolymer" is used herein to denote a polymer which contains at least 10%, preferably at least 25%, by weight of fluorine, or a mixture of two or more such polymers.

The composition of the invention comprises a polymer component and may also comprise other components, e.g. particulate fillers.

The first constituent of the polymer component in compositions of the invention is FEP, a copolymer of tetrafluoroethylene (TFE), having the repeat unit —CF$_2$—CF$_2$—, and hexafluoropropylene (HFP), having the repeat unit —CF$_2$—CF(CF$_3$)—. For purposes of this specification, the term "FEP" is used to include other polymers, e.g. terpolymers, in which the primary monomers are TFE and HFP and in which a third monomer is present. For example, the term FEP is used herein to include a terpolymer of TFE, HFP, and a third monomer, in which the third monomer is present in a small amount, e.g. less than 5% by weight of the polymer. The third monomer might be, for example, perfluoropropylvinyl ether, perfluoromethylvinyl ether, perfluoroethylvinyl ether, or perfluorobutylvinyl ether, or any other suitable monomer. Preferably the FEP has an HFP content of 1 to 15%, e.g. 12%, based on the total weight of TFE and HFP (and any third monomer which is present). The peak melting temperature, as measured by differential scanning calorimeter (DSC) is about 260° C. A preferred FEP is available from E.I. du Pont de Nemours under the tradename TEFLON FEP. The FEP is present in the composition in an amount x which is 35 to 85%, preferably 35 to 75%, particularly 40 to 75%, especially 45 to 75% by weight of the total polymer component of the composition. It is preferred that the FEP component be the majority polymer in the composition.

The second constituent of the polymer component is PFA, a copolymer of perfluoropropylvinyl ether (PPVE), having the repeat unit —CF$_2$—CF(OC$_3$F$_7$)—, and TFE. The term "PFA" is used herein to include other polymers, e.g. terpolymers, in which the primary monomers are TFE and PPVE. For example, the term PFA is used herein to include a terpolymer of TFE, PPVE, and a third monomer, in which the third monomer is present in a small amount, e.g. less than 5% by weight of the polymer. The third monomer might be, for example, perfluoromethylvinyl ether, perfluoroethylvinyl ether, or perfluorobutylvinyl ether, or any other suitable monomer. The term "PFA" is also used herein to include a polymer in which the primary monomers are TFE and a vinyl ether other than PPVE, e.g. perfluoromethylvinyl ether, perfluoroethylvinyl ether, or perfluorobutylvinyl ether. When the second constituent comprises a copolymer of TFE and PPVE, preferably the PFA has a PPVE content of 1 to 10%, e.g. 2 to 4%, based on the total weight of TFE and PPVE. The peak melting temperature is about 305° C. A preferred PFA is available from E.I. du Pont de Nemours under the tradename TEFLON PFA. The PFA is present in the composition in an amount y which is 10 to 60%, preferably 10 to 50%, particularly 15 to 45%, especially 20 to 40% by weight of the total polymer component of the composition.

The third constituent of the polymer component is polytetrafluoroethylene (PTFE), a polymer which has the TFE repeat unit. It is important that the PTFE resin which is used be melt-processable and/or melt-shapeable, i.e. that the resin have a molecular weight and melt-viscosity sufficiently low that difficult and expensive processing techniques such as sintering are not required in order to shape the polymer. The PTFE may be prepared in the form of a relatively low molecular weight material, e.g. during the polymerization step or by degrading a high molecular weight polymer, or it may be obtained by irradiating a high molecular weight polymer as described in U.S. Pat. Nos. 4,624,990 and 4,859,836 (Lunk et al), the disclosures of which are incorporated herein by reference. The PTFE used in the composition has a crystallinity of at least 50%, preferably at least 60%, particularly at least 65%. The peak melting temperature is about 330° C. A suitable PTFE is available,, from E.I. du Pont de Nemours under the tradename TEFLON MP 1000. The PTFE is present in the composition in an amount z which is 5 to 60%, preferably 5 to 45%, particularly 5 to 40%, especially 5 to 35% by weight of the total polymer component of the composition.

In order to provide a composition which has adequate physical properties, the quantity (y+z)/x is 0.3 to 2, preferably 0.4 to 1.8, particularly 0.5 to 1.6. It is preferred that the quantity (y/z) is 0.2 to 10, particularly 0.25 to 10, especially 0.4 to 8.0. It is often preferred that the quantity (y/z) be at least 1.0, preferably at least 2.0, e.g. 3 to 8. If the quantity (y/z) is too low, e.g. less than 0.2, although the composition will have good creep properties (i.e. low creep) and good modulus (i.e. high modulus), it may be too brittle for successful melt-shaping.

In addition to the fluoropolymer components, the composition may comprise dispersing agents, coupling agents, antioxidants, inert fillers, stabilizers, flame retardants, crosslinking agents (prorads), or other conventional additives. Generally, the additives comprise at most 30% by weight of the total composition. For some applications, it may be desirable to add a small amount, e.g. up to 20% by weight, of another polymer, e.g. an elastomer, to provide particular properties to the composition such as enhanced flexibility or compatibility. When such a polymeric additive is present, it is included as part of the total polymer component of the composition. For some applications, the composition may be rendered conductive by the addition of a conductive particulate filler. Suitable fillers include carbon black, graphite, metal in the form of powder, flakes, or fibers, metal oxides, metal-coated fibers or particles, or other materials such as comminuted conductive polymer. The amount and type of conductive filler needed is dependent on the required resistivity of the composition, the relative ratio of the fluoropolymer components, and the type of processing. Conductive compositions of this type may be used to prepare electrical devices such as heaters, sensors, and circuit protection devices such as those disclosed in U.S. Pat. Nos. 3,861,029 (Smith-Johannsen et al); 4,177,376 (Horsma et al); 4,188,276 (Lyons et al); 4,237,441 (van Konynenburg et al); 5 4,238,812 (Middleman et al); 4,286,376 (Smith-Johannsen et al); 4,318,881 (Sopory); 4,352,083 (Middleman et al); 4,388,607 (Toy et al); 4,413,301 (Middleman et al); 4,426,339 (Kamath et al); and 4,591,700 (Sopory), the disclosures of which are incorporated herein by reference. Alternatively, conductive compositions can be used as conductive jackets for electrical cables such as high frequency attenuation cables as disclosed in U.S. Pat. No. 4,347,487 (Martin), the disclosure of which is incorporated herein by reference.

The components of the composition may be mixed using any appropriate technique including melt blending, solvent blending, and dispersion blending in an aqueous solution. Depending on the loading of the components and the mixing equipment, it may be preferred that two of the three polymer components, e.g. the PFA and the PTFE, be mixed to form a masterbatch which is then mixed with the third component, FEP. For many applications it is preferred that the composition be melt-processed, e.g. by the use of conventional polymer processing equipment such as internal mixers or extruders. Following mixing, the composition may be shaped in any suitable manner, e.g. melt-shaped by means of extrusion, injection-molding, or compression-molding, or sintered.

In order to have the necessary physical properties for use as a jacket insulation or in other applications, it is desirable that the composition have low creep, good modulus retention at high temperature, low secondary crystallization, and excellent tensile properties, particularly high elongation to break (e.g. as high as 300%) which is indicative of high ductility, a useful property for insulating jackets. Compositions of the invention have a low percent creep (i.e. a high resistance to creep, also referred to as creep strain) as measured at 150° C., i.e. above the glass transition temperature $T_g$ of the material. After 10 hours with an applied stress of 300 psi (2.07 MPa) and following a procedure which is a modification of ASTM 2990 as described hereinafter, the percent creep is less than 15%, preferably less than 12%, particularly less than 10%, e.g. 3 to 8%.

The storage modulus, G', as defined by ASTM 4065, is high for compositions of the invention. When measured at 275° C. in the torsion mode with a strain of 0.85% and a frequency of 6.28 radians/second (1.0 Hz) using a RHEOMETRICS Dynamic Analyzer model RDA-II, the modulus is at least $5 \times 10^7$ dynes/cm$^2$, preferably at least $7 \times 10^7$ dynes/cm$^2$.

When the secondary crystallization of the composition is low and/or the creep resistance is high, the composition has improved stress-crack resistance. For purposes of this application, the secondary crystallization is calculated based on the crystallinity determined from the first heat endotherms of differential scanning calorimeter (DSC) scans of samples which have been heated to a temperature at least 25° C. above the melting temperature of the polymer and then quenched by plunging into ice water (i.e. % $X_c$ Quenched) and samples which have been heat-treated for 24 hours at 240° C. (i.e. % $X_c$ Annealed). The melting temperature of the polymer is defined as the peak temperature of the first heat DSC endotherm. If the mixture exhibits more than one melting peak, the melting temperature is defined as that of the higher melting polymer. The secondary crystallization (% $2^*X_c$) is calculated from the equation $$\% \, 2^*X_c = [(\% \, X_c \text{ Annealed} - \% \, X_c \text{ Quenched})/(\% \, X_c \text{ Quenched})].$$

For purposes of calculating the crystallinity according to the procedure of ASTM 4591, the heat of fusion was 87.9 J/g for 100% crystalline FEP, and 92.9 J/g for 100% crystalline PFA or PTFE. Compositions of the invention generally have a secondary crystallization which is less than that of PFA, i.e. less than 20%, preferably less than 18%, particularly less than 16%, e.g. 4 to 12%.

The tensile properties of the compositions, as determined by tensile strength and percent elongation to break, are relatively high. Both the tensile strength in psi and the percent elongation at 23° C. are tested in accordance with ASTM-D638 test procedure and are measured using an INSTRON mechanical tester. The tensile strength at ambient temperature (defined as 23° C. for purposes of this specification) is at least 3000 psi (20.7 MPa), preferably at least 3200 (22.1 MPa), particularly at least 3400 psi (23.4 MPa). The elongation to break at ambient temperature is at least 200%, preferably at least 225%, particularly at least 250%.

In one embodiment of the invention, the composition is used as a jacketing material around a resistive element, for example, for a conductive polymer heating cable. In this application, the composition provides electrical insulation and mechanical and environmental protection to the resistive element. The resistive element may comprise a conductive polymer composition, i.e. an organic polymer in which is dispersed a particulate conductive filler. The conductive polymer composition, which may also comprise a composition of the invention, may exhibit positive temperature coefficient of resistance (PTC) behavior. The resistive element also comprises at least two electrodes, frequently elongate wire electrodes, which can be connected to a source of electrical power and which, when so connected, cause current to flow through the conductive polymer element. Examples of conductive polymer heating cables for which compositions of the invention could be used are disclosed in U.S. Pat. Nos. 3,861,029 (Smith-Johannsen et al); 3,914,363 (Bedard et al); 4,177,376 (Horsma et al); 4,242,573 (Batliwalla); 4,334,148 (Kampe); 4,334,351 (Sopory); 4,388,607 (Toy et al); 4,426,339 (Kamath et al); and 4,459,473 (Kamath), the disclosures of which are incorporated herein by reference.

The invention is illustrated by the drawing in which FIG. 1 is a cross-sectional view of an electrical device 1 which is a self-regulating strip heater. First and second elongate wire electrodes 2, 3 are embedded in a conductive polymer composition 4 to form a resistive heating element. The resistive heating element is surrounded by an electrically insulating jacket 5 prepared from a composition of the invention.

FIGS. 2, 3, and 4 indicate the percent creep strain, modulus, and secondary crystallization as a function of $(y+z)/x$, respectively, for compositions of the invention. In these figures, x is the percent by weight of the FEP component, y is the percent by weight of the PFA component, and z is the percent by weight of the PTFE component. For each figure, lines indicating the best fit to the comparative examples (i.e. two component systems) are shown. FIGS. 2, 3, and 4 illustrate the positive synergy which occurs by mixing the three components of the invention in the ratios specified by the invention. In FIG. 2, examples below the line show positive synergy for creep strain. In FIG. 3, examples above the line show positive synergy for storage modulus at 275° C., a temperature above the melting point of FEP. In FIG. 4, examples below the line show positive synergy for percent secondary crystallization.

The invention is illustrated by the following examples.

EXAMPLES 1 TO 29

The invention is illustrated by the compositions of the following examples in which Examples 1 to 4, 6, 9, 13, 16, 19, 22, 25, 28, and 29 are comparative examples. Unless otherwise indicated, all compositions were prepared and tested using the following procedures. The results are shown in Table I. The advantages of compositions of the invention over conventional two-component systems (comparative Examples 6, 9, 13, 16, 19, 22, 25, 28, and 29) in terms of percent creep strain, modulus, and secondary crystallization are shown in FIGS. 2, 3, and 4, respectively. In addition, for a number of examples, the synergistic effect of the three-component systems of the invention is shown by comparing the values predicted based on a linear mixture rule for miscible polymers with the results actually achieved. See, for example, pages 5 to 9 in "Predicting the Properties of Mixtures: Mixture Rules in Science and Engineering" by Lawrence E. Nielsen (Marcel Dekker, Inc., 1978), the disclosure of which is incorporated herein by reference. For these calculations, the following formula was used:

$$P_c = P_x(\text{wt \%} x) + P_y(\text{wt \%} y) + P_z(\text{wt \%} z)$$

where P represents the given property, $P_c$ is the predicted value of the property of the composition, $P_x$ is the measured value of the property for component x (i.e. 100% FEP), $P_y$ is the measured value of the property for component y (i.e. 100% PFA), and $P_z$ is the measured value of the property for component z (i.e. 100% PTFE). Because 100% PTFE has no mechanical properties by itself, the values of creep strain, tensile strength, and elongation were based solely on the FEP and PFA components. The predicted results are shown in Table II as compared to experimentally derived results. In all cases, the actual creep strain of the composition was less than that predicted. For most compositions, the predicted value of the secondary crystallization was much greater than that actually measured, the predicted tensile strength was less than that actually measured, and the predicted elongation was less than that actually measured. The results are shown in Table II.

Preparation of Compositions

Four different fluoropolymers, each available from E.I. du Pont de Nemours, were used: TEFLON FEP 140 (a copolymer of tetrafluoroethylene (TFE) and hexafluoropropylene (HFP), containing about 12% by weight HFP and having a melt flow index of about 3.1 g/10 min), TEFLON FEP 160 (a copolymer of tetrafluoroethylene (TFE) and hexafluoropropylene (HFP), containing about 12% by weight HFP and having a melt flow index of about 1.2 g/10 min), TEFLON PFA 350 (a copolymer of TFE and perfluoropropylvinyl ether (PPVE), containing 2 to 4% by weight PPVE and having a melt flow index of about 2.0 g/10 min), and TEFLON PTFE MP-1000 (polytetrafluoroethylene with approximately 73% crystallinity, a melting temperature of 330° C. and a melt flow rate of 4).

One or two component mixtures: Using a BRABENDER mixer having a capacity of 60 cm$^3$ and heated to 350° C., a total of approximately 110 grams of polymer in the appropriate weight ratio as indicated in Table I was mixed for approximately 15 minutes, the time required for the torque to reach a constant value. Mixing was then continued for an additional 5 minutes. The mixture was removed from the mixing chamber and cooled to ambient temperature by compression molding the mixture into a sheet of 0.125 inch (3.18 mm) thickness using a cold press. In order to produce samples for subsequent tests, the cooled sheet was placed between aluminum plates separated by a frame of specified thickness (e.g. 0.020 inch (0.51 mm)). This assembly was inserted into a hot press heated to 350° C., preheated at contact pressure for 5 minutes, and then compression molded for 3 to 10 minutes at about 200 to 300 psi (1.38 to 2.07 MPa). After 10 minutes, the molded sheet was removed from the press and quenched by plunging it into an ice-water bath. Samples of appropriate size and shape were then cut from the quenched sheet.

Three component mixtures: A preblend of PFA and PTFE containing weight ratios corresponding to the particular composition desired was prepared using the Brabender mixer as above. The preblend composition was cooled and chopped and the chopped pieces were added to the FEP pellets in the appropriate weight ratio in the Brabender mixer. The blend was then mixed and compression-molded as described above.

The "experimental" data for examples 11, 12, 20, and 21 are numbers produced from a statistical analysis of a series of experiments run in a strategy of experiment program. The numbers were generated using regression equations based on contour plots reflecting the results from the strategy of experiment program. For experiments run as part of the program, there was good correlation between the predicted results and the actual data.

Creep (%)

Samples with dimensions of 3×0.16×0.020 inch (76.2×4.1×0.5 mm) were cut from quenched sheet, heat-treated at 240° C. for 24 hours, and then cooled at ambient temperature (23° C. to 27° C. for 4 hours prior to testing. The procedure of ASTM 2990, the disclosure of which is incorporated herein by reference, was followed except that in place of an anvil displacement gauge or a dial gauge, a linear voltage displacement transducer, available from Schaevitz Engineering, was used. Creep deformation for applied stress was measured in an extension mode with an initial sample gauge length of 1.0 inch (25.4 mm). The sample was stored at 150° C. with an applied stress of 300 psi (2.07 MPa). The creep after 10 hours was measured and is reported in Table I.

Modulus (G')

The high temperature modulus was defined as the storage modulus, G', measured by the use of a RHEOMETRICS Dynamic Analyzer model RDA-II. Quenched samples with dimensions of 1.18×0.49×0.06 inch (30×12.5×1.5 mm) were measured in the torsion mode with a strain of 0.85% and a frequency of 6.28 radians/second (1.0 Hz). The storage modulus was measured as a function of temperature between 150° C. and 320° C. at a rate of 5° C./minute and the value in dynes/cm$^2$ at 275° C. was reported.

Crystallinity (% $X_c$)

Using a SEIKO DSC 220C calorimeter, approximately 10 mg of the composition was heated at 10° C./minute to 350° C. and the first heat melting endotherm was measured. Peak melting temperature and heat of fusion were recorded from this first heat melting endotherm, and the percent crystallinity was then calculated. The heat of fusion was 87.9 J/g for 100% crystalline FEP, and 92.9 J/g for 100% crystalline PFA or PTFE. Values were determined for samples which had been quenched in ice-water as described above (% $X_c$ Quenched) and for samples which had been heat-treated for 24 hours at 240° C. (% $X_c$ Annealed). The secondary crystallinity (% 2° crystallization, % 2°$X_c$) was calculated from the following equation:

$$\% \; 2°X_c = [(\% \; X_c \; \text{Annealed} - \% \; X_c \; \text{Quenched})/(\% \; X_c \; \text{Quenched})]$$

Tensile and Elongation Properties

Using the test procedure described in ASTM-D638, the tensile strength in psi and the percent elongation at 23° C. were measured with an INSTRON model 4501 mechanical tester. Dumbbell-shaped tensile specimens with a thickness of 0.020 inch (0.51 mm) and a width in the narrow section of 0.16 inch (4 mm) were prepared from quenched samples and clamped in a vertical position at upper and lower ends between jaws. The samples were pulled at a speed of 2.0 inch/minute (51 mm/minute). The tensile strength and the percent elongation at break were reported.

Melt Flow Rate (MFR)

Using the procedure described in ASTM-1238-82, the melt flow rate (i.e. the melt index) was determined. Pellets of the raw polymers and pieces of the compression molded sheet for the mixed compositions were tested at 372° C. using a TINIUS OLSEN extrusion plastometer. The amount of polymer in grams passing through the capillary (0.082 inch (0.0032 mm) diameter) during a 10 minute period when an 11 lb (5 kg) weight was applied to the polymer was recorded.

TABLE I

Experimental Results

| Example | Composition (wt %) | | | | Creep Strain (%) | G' @ 275° C. (Dynes/cm$^2$ × 10$^7$) | % $X_c$ Quenched | % $X_c$ Annealed | % 2° Crystallization | Tensile Strength (psi) | Elongation (%) | MFR (g/10 min) |
|---|---|---|---|---|---|---|---|---|---|---|---|---|
| | FEP 140 | FEP 160 | PFA 350 | PTFE | | | | | | | | |
| 1* | 100 | | | | 29 | Melted | 19 | 25 | 32 | 4000 | 330 | 3.1 |
| 2* | | 100 | | | 43 | 0.5 | 19 | 23 | 21 | 4140 | 340 | 1.2 |
| 3* | | | 100 | | 7 | 11 | 28 | 34 | 21 | 4260 | 320 | 2.0 |
| 4* | | | | 100 | | | 73 | 73 | 0 | | | 4.0** |
| 5 | 85 | | 10 | 5 | 17 | 4 | 21 | 22 | 5 | 3880 | 310 | 2.3 |
| 6* | 85 | 15 | | | 23 | 3 | 26 | 29 | 12 | 4050 | 340 | 2.9 |
| 7 | 65 | 30 | 5 | | 11 | 7 | 23 | 25 | 9 | 3980 | 320 | 2.2 |
| 8 | 65 | | 10 | 25 | 6 | 8 | 28 | 31 | 11 | 3370 | 320 | 2.2 |
| 9* | 65 | 35 | | | 13 | 5 | 27 | 30 | 11 | 4230 | 320 | 2.7 |
| 10 | 55 | 38 | 7 | | 8 | 7 | 24 | 27 | 13 | 3500 | 320 | 2.1 |
| 11+ | 50 | 40 | 10 | | 7 | 8 | 25 | 28 | 12 | 4100 | 320 | |
| 12+ | 50 | 10 | 40 | | 4 | 12 | 35 | 37 | 6 | 3130 | 300 | |
| 13* | 50 | 50 | | | 9 | 5 | 26 | 31 | 19 | 4070 | 320 | |
| 14 | 45 | 50 | 5 | | 9 | 9 | 22 | 27 | 23 | 3860 | 310 | 2.2 |
| 15 | 45 | 10 | 45 | | 4 | 14 | 34 | 37 | 9 | 2550 | 290 | 1.4 |
| 16* | 45 | 55 | | | 8 | 10 | 27 | 32 | 19 | 4250 | 320 | 2.6 |
| 17 | 35 | 50 | 15 | | 5 | 11 | 26 | 31 | 19 | 4100 | 320 | |
| 18 | 35 | 20 | 45 | | 3 | 15 | 36 | 44 | 22 | 2700 | 300 | |
| 19* | 35 | 65 | | | 8 | 13 | 28 | 33 | 18 | 4160 | 320 | |
| 20+ | 34 | 56 | 10 | | 7 | 11 | 24 | 29 | 21 | 4100 | 320 | |
| 21+ | 34 | 10 | 56 | | 6 | 17 | 36 | 43 | 19 | 3130 | 300 | |
| 22* | 34 | | | 66 | Brittle | Brittle | 46 | 51 | 14 | 1980 | 30 | |
| 23 | | 50 | 40 | 10 | 16 | 7 | 32 | 33 | 3 | 4100 | 320 | |
| 24 | | 50 | 10 | 40 | 12 | 9 | 35 | 40 | 14 | 3130 | 300 | |
| 25* | | 50 | | 50 | 10 | 11 | 37 | 39 | 5 | 2390 | 250 | |
| 26 | | 34 | 56 | 10 | 11 | 13 | 33 | 34 | 3 | 4210 | 320 | |
| 27 | | 34 | 10 | 56 | 5 | 15 | 39 | 45 | 15 | 2340 | 280 | |
| 28* | | 34 | | 66 | Brittle | Brittle | 44 | 49 | 11 | 1980 | 35 | |

TABLE I-continued

| | Composition (wt %) | | | | Creep Strain (%) | G' @ 275° C. (Dynes/cm² × 10⁷) | % $X_c$ Quenched | % $X_c$ Annealed | % 2° Crystal-lization | Tensile Strength (psi) | Elongation (%) | MFR (g/10 min) |
|---|---|---|---|---|---|---|---|---|---|---|---|---|
| Example | FEP 140 | FEP 160 | PFA 350 | PTFE | | | | | | | | |
| 29* | | | 60 | 40 | 2 | 21 | 41 | 48 | 17 | 3450 | 290 | |

*Comparative examples.
**Data from DuPont technical literature.
+Calculated results using regression equations generated from a strategy of experimentation program.

TABLE II

| | Composition (Wt %) | | | | Experimental Creep Strain (%) | Predicted Creep Strain (%) | Experimental % 2° Crystal-lization | Predicted % 2° Crystal-lization | Experimental Tensile Strength (psi) | Predicted Tensile Strength (psi) | Experimental Elonga-tion (%) | Predicted Elonga-tion (%) |
|---|---|---|---|---|---|---|---|---|---|---|---|---|
| Example | FEP 140 | FEP 160 | PFA 350 | PTFE | | | | | | | | |
| 1* | 100 | | | | 29 | | 32 | | 4000 | | 330 | |
| 2* | | 100 | | | 43 | | 21 | | 4140 | | 340 | |
| 3* | | | 100 | | 7 | | 21 | | 4260 | | 320 | |
| 4* | | | | 100 | | | 0 | | | | | |
| 5 | 85 | 10 | 5 | | 17 | 25 | 5 | 5 | 3880 | 3826 | 310 | 312 |
| 7 | 65 | 30 | 5 | | 11 | 21 | 9 | 9 | 3980 | 3878 | 320 | 311 |
| 8 | 65 | 10 | 25 | | 6 | 20 | 11 | 11 | 3370 | 3026 | 320 | 247 |
| 10 | 55 | 38 | 7 | | 8 | 19 | 13 | 13 | 3500 | 3819 | 320 | 303 |
| 11+ | 50 | 40 | 10 | | 7 | 17 | 12 | 12 | 4100 | 3704 | 320 | 293 |
| 12+ | 50 | 10 | 40 | | 4 | 15 | 6 | 6 | 3130 | 2426 | 300 | 197 |
| 14 | 45 | 50 | 5 | | 9 | 17 | 23 | 23 | 3860 | 3930 | 310 | 309 |
| 15 | 45 | 10 | 45 | | 4 | 14 | 9 | 9 | 2550 | 2226 | 290 | 181 |
| 17 | 35 | 50 | 15 | | 5 | 12 | 19 | 19 | 4100 | 3530 | 320 | 276 |
| 18 | 35 | 20 | 45 | | 3 | 12 | 22 | 22 | 2700 | 2252 | 300 | 180 |
| 20+ | 34 | 56 | 10 | | 7 | 14 | 21 | 21 | 4100 | 3746 | 320 | 291 |
| 21+ | 34 | 10 | 56 | | 6 | 11 | 19 | 19 | 3130 | 1786 | 300 | 144 |

*Comparative examples.
**Data from DuPont technical literature.
+Calculated results using regression equations generated from a strategy of experimentation program.

What is claimed is:

1. A polymer composition comprising a polymer component which contains three different polymers which comprises (A) an amount x which is 35 to 85% by weight of the total polymer component of a first polymer which is a copolymer of tetrafluoroethylene and hexafluoropropylene (FEP) as primary monomers optionally with one or more other monomers, (B) an amount y which is 10 to 60% by weight of the total polymer component of a second polymer which is a copolymer of tetrafluoroethylene and perfluoropropylvinyl ether (PFA) as primary monomers optionally with one or more other monomers, and (C) an amount z which is 5 to 60% by weight of the total polymer component of a third polymer which is (i) a fluoropolymer which is polytetrafluoroethylene (PTFE) and (ii) melt-processable, wherein the quantity (y+z)/x is 0.3 to 2 and the composition (1) has creep at 150° C. and 300 psi for 10 hours of less than 15%, (2) has a modulus at 275° C. of at least $5 \times 10^7$ dynes/cm², (3) has secondary crystallization of less than 20%, and (4) has a tensile strength at ambient temperature of at least 3000 psi.

2. A composition according to claim 1 wherein x is 35 to 75% by weight FEP, y is 10 to 50% by weight PFA, and z is 5 to 45% by weight of PTFE which is melt-processable.

3. A composition according to claim 1 wherein the quantity (y+z)/x is 0.4 to 1.8.

4. A composition according to claim 3 wherein the quantity (y+z)/x is 0.5 to 1.6.

5. A composition according to claim 1 wherein the creep is less than 12%.

6. A composition according to claim 1 wherein the modulus is at least $7 \times 10^7$ dynes/cm².

7. A composition according to claim 1 wherein the secondary cyrstallization is less than 18%.

8. A composition according to claim 7 wherein the secondary crystallization is less than 16%.

9. A composition according to claim 1 wherein the tensile strength is at least 3200 psi.

10. A composition according to claim 9 wherein the tensile strength is at least 3400 psi.

11. A composition according to claim 1 which has an elongation to break at 23° C. of at least 200%.

12. A composition according to claim 11 wherein the elongation to break is at least 250%.

13. A composition according to claim 1 wherein the quantity y/z is 0.2 to 10.

* * * * *